US005337784A

United States Patent [19]

Grubb

[11] Patent Number: 5,337,784

[45] Date of Patent: Aug. 16, 1994

[54] FLOW CONTROL VALVE

[75] Inventor: Eddie C. Grubb, Lexington, Ky.

[73] Assignee: E-Z Dispensers, Inc., Lexington, Ky.

[21] Appl. No.: 968,033

[22] Filed: Oct. 26, 1992

[51] Int. Cl.[5] .......... F16K 3/24; F16K 3/32

[52] U.S. Cl. .......... 137/625.38; 137/625.3; 251/205

[58] Field of Search .......... 137/625.38, 625.3; 251/205

[56] References Cited

U.S. PATENT DOCUMENTS

| | | | |
|---|---|---|---|
| 3,112,764 | 12/1963 | Anderson et al. | 137/625.3 X |
| 3,693,659 | 9/1972 | Parola | 137/625.38 X |
| 3,955,759 | 5/1976 | Knapp | 137/625.3 X |
| 5,014,746 | 5/1991 | Heymann | 137/625.38 X |

OTHER PUBLICATIONS

IMI Cornelius, Inc. "Pressurized Liquid-Base Beverage Dispenser", Jul. 30, 1991.

IMI Cornelius Inc, "Pressurized Liquid-Base Beverage Dispenser, Section VI Illustrated Parts Breakdown", Feb. 15, 1988.

*Primary Examiner*—Arnold Rosenthal

*Attorney, Agent, or Firm*—King & Schickli

[57] ABSTRACT

An apparatus is provided for dispensing a beverage made from a mixture of drink concentrate and water. The apparatus includes a valve assembly for controlling the rate of water and drink concentrate flow. A first conduit delivers water from a water source to the valve assembly. Additionally, the apparatus includes a second conduit for delivering drink concentrate from the drink concentrate source to the valve assembly. The valve assembly includes a flow control valve having a housing including a cavity, a fluid inlet and a fluid outlet. A cylindrical valve body is received in the cavity and includes a stepped arrangement of flow apertures radially arrayed about the valve body. Each flow aperture is spaced from an adjacent flow aperture by at least a 45° arc. Additionally, each flow aperture has a diameter of between 1/20 and 1/40 of an inch. The valve assembly functions to provide a water to drink concentrate ratio of between 120:1-135:1.

4 Claims, 3 Drawing Sheets

FLOW CONTROL VALVE

TECHNICAL FIELD

The present invention relates generally to the drink dispenser art and, more particularly, to a precision flow control valve for a drink dispenser.

BACKGROUND OF THE INVENTION

Apparatus for dispensing beverages such as iced tea or soft drinks have long been known in the art and are commonly utilized in the restaurant and catering fields. Such apparatus generally mix a drink concentrate with water (either tap or spring water for tea, carbonated water for soft drinks) in the proper proportions to provide desirable taste as the drink is dispensed into a glass for consumption.

Up until the present invention, flow control valves for metering the drink concentrate have generally been designed to provide a ratio of between 5:1 to 11:1 water to drink concentrate. These delivery ratios, of course, limit the strength at which the drink concentrate may be prepared.

If it were possible to provide a precision flow control valve capable of accurately metering smaller amounts of drink concentrate while still providing a beverage to suit taste, significant advantages would result. Specifically, it should be appreciated that sources or containers of drink concentrate must be limited in volume to allow easy handling. Accordingly, if the drink concentrate could be made, for example, 25 times stronger the drink concentrate source would last 25 times longer when mixed with water to make drinks of equivalent strength. Accordingly, an operator would spend one 25th the time he presently spends changing out exhausted drink concentrate sources with new sources. This significant time saving frees the operator to perform other tasks that effectively increase the productivity and efficiency of a restaurant operation.

SUMMARY OF THE INVENTION

Accordingly, it is a primary object of the present invention to provide a flow control valve for a beverage dispenser of relatively simple structure that may be retrofitted into beverage dispensers of existing design.

Another object of the present invention is to provide a precision drink dispensing apparatus including a unique flow control valve allowing accurate metering of relatively small quantities of drink concentrate within a gravity flow system. Accordingly, a pressurized fluid source is not required to maintain proper operation. Such a simplified system is easier to operate and maintain.

Still another object of the invention is to provide a flow control valve incorporating a unique arrangement of flow apertures specifically adapted to provide precision metering of a drink concentrate for mixing with water or other mixer at a ratio of water to drink concentrate as high as 150:1. Such a flow control valve advantageously prevents "bleed-through" between flow apertures to insure accurate dispensing and the mixing of a drink to desired strength and taste.

Yet another object is to provide an improved, low-maintenance beverage dispenser incorporating a precision flow control valve providing enhanced sensitivity for accurately metering small amounts of drink concentrate for mixing.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved flow control valve for a beverage dispensing apparatus and an improved beverage dispensing apparatus are provided. Specifically, the flow control valve for accurately metering small amounts of fluid such as drink concentrate includes a housing having a cavity, a fluid inlet and a fluid outlet. A cylindrical valve body is received in the cavity. The valve body includes a stepped arrangement of flow apertures radially arrayed about the valve body. Each flow aperture is spaced from an adjacent flow aperture by at least a 45° arc. This spacing substantially prevents the bleed-through of fluid from one flow aperture to another that otherwise tends to occur in a vertically stacked arrangement as a result of fluid mechanics. Accordingly, more sensitive and accurate metering of fluid flow is provided. This is a significant advantage when fixing a drink concentrate with water to provide a beverage of desired taste.

In accordance with another important aspect of the present invention, the flow apertures each have a diameter of between 1/20–1/40 of an inch and preferably approximately 1/25 of an inch. As a result, the drink concentrate may be metered to provide a water to drink concentrate ratio of between 2:1 to 150:1, with fine adjustment being possible, for example, over a range of 120:1–135:1. This latter ratio is between 10 and 25 times that of state of the art flow control valves for drink concentrate. Accordingly, it should be appreciated that the drink concentrate may be made stronger and a given volume of drink concentrate will produce between 10 and 25 times more mixed beverage. This means that the drink concentrate source will last between 10 and 25 times longer before requiring replacement. Accordingly, time spent on this inconvenient and unproductive task is significantly reduced to the advantage of the operator.

In accordance with additional structural features of the flow control valve, a cylindrical regulating element is concentrically received within the valve body. The regulating element includes open ends to allow the passage of drink concentrate therethrough. Further, means, in the form of an adjustment or set screw, is provided for adjusting the position of the regulating element relative to the valve body. In order to ensure that the regulating element is constantly maintained in proper position, means, such as a spring, is provided for biasing the regulating element into engagement with the adjusting screw.

Since the flow apertures in the valve body are each positioned at a different point along the longitudinal axis of the valve body, the adjustment of the relative position of the regulating element allows one or more of the apertures to be exposed for the passage of drink concentrate. Accordingly, the flow rate of drink concentrate relative to the water mixture may be adjusted so that the resulting beverage may be mixed to a desired taste.

In accordance with a further aspect of the present invention, an apparatus is provided for dispensing a beverage that as described above, is a mixture of a drink concentrate and water. The apparatus is connected to both a water source and a drink concentrate source. First and second valve means are provided for controlling, respectively, the rate of flow of water and drink concentrate. Similarly, first and second conduits are provided for delivering the water and drink concentrate, respectively, from their respective sources to their respective valves. Finally, means are provided for actuating or opening tandem on/off valves so as to allow flow through the first and second valve means and the mixing of the beverage. Preferably, the ratio of water to drink concentrate in the mixed beverage is between 120:1–135:1. As indicated above, the ability to accurately provide a mixture at such a ratio allows beverage to be dispensed for a significantly longer period of time before it is necessary to change or renew the drink concentrate source.

Additionally, in an effort to further reduce maintenance requirements and provide more convenient operation, the drink concentrate source is positioned above the second valve to allow gravity flow through the second conduit. Of course, as the drink concentrate is delivered at such a slow rate of flow during operation, it is necessary to ensure that trapped air is removed from the second conduit. Accordingly, the second conduit includes a T-joint and a vent tube extending from the T-joint for this purpose. A cap for the vent tube may also be provided to prevent dirt from entering the vent tube once air is vented and the gravity flow of drink concentrate is established.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3 is a cross-sectional view of the fully assembled flow control valve depicting the flow of drink concentrate therethrough; and .

Reference will now be made in detail to the present preferred embodiment of the invention, an example of which is illustrated in the accompanying drawing.

DETAILED DESCRIPTION OF THE INVENTION

Figure 1:
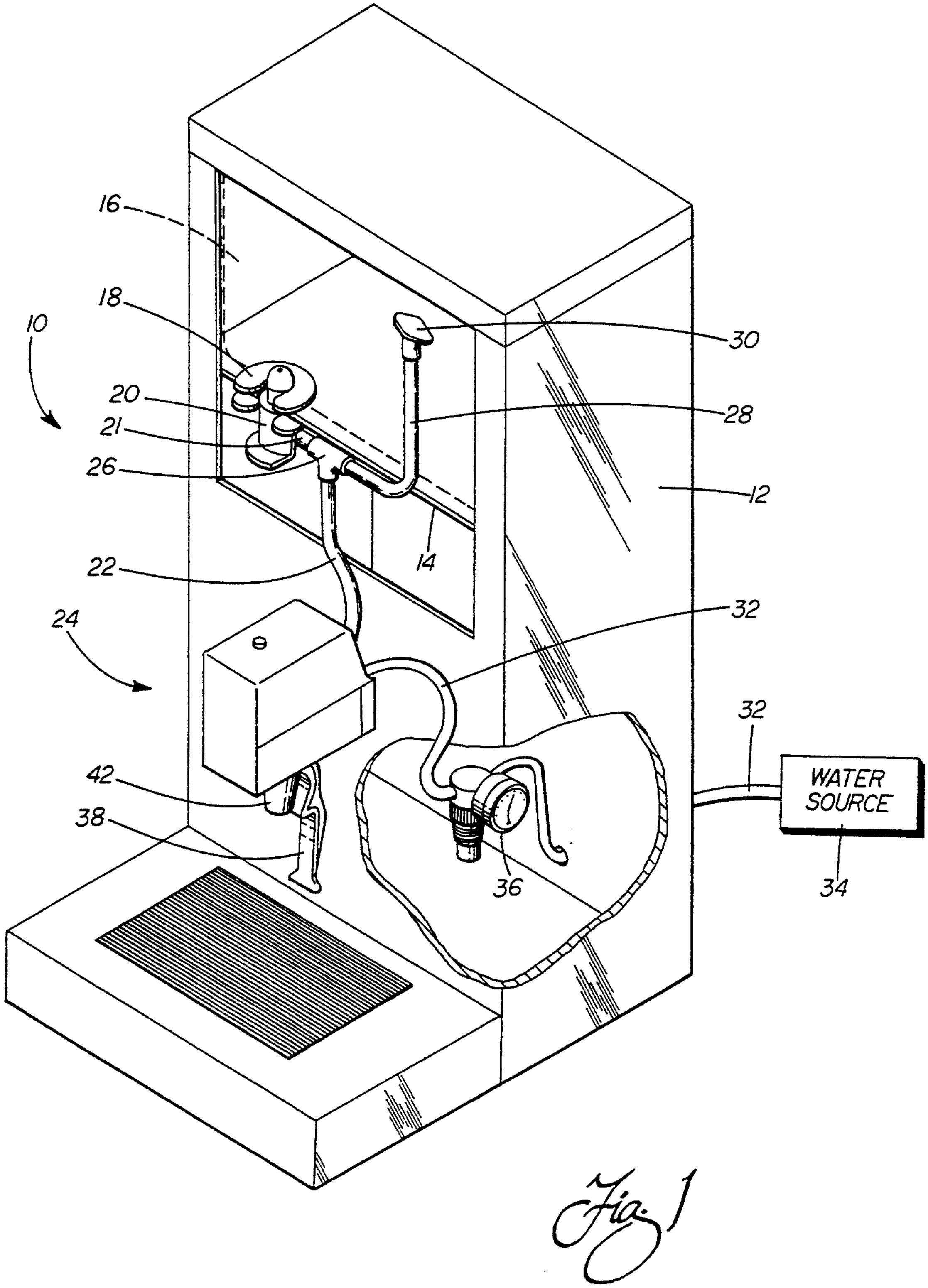
FIG. 1 is a perspective and partially fragmentary view of the dispensing apparatus of the present invention.

As shown in FIG. 1, the dispensing apparatus 10 of the present invention includes a housing 12 formed from stainless steel, plastic or other appropriate material. A shelf 14 extends across the housing. A source of drink concentrate 16 may be positioned on the shelf 14. As shown, the source 16 may be a bag-in-box arrangement of a type known in the art. Such an arrangement includes a bib connector 18 for establishing flow through a QDC valve 20.

Figure 4:
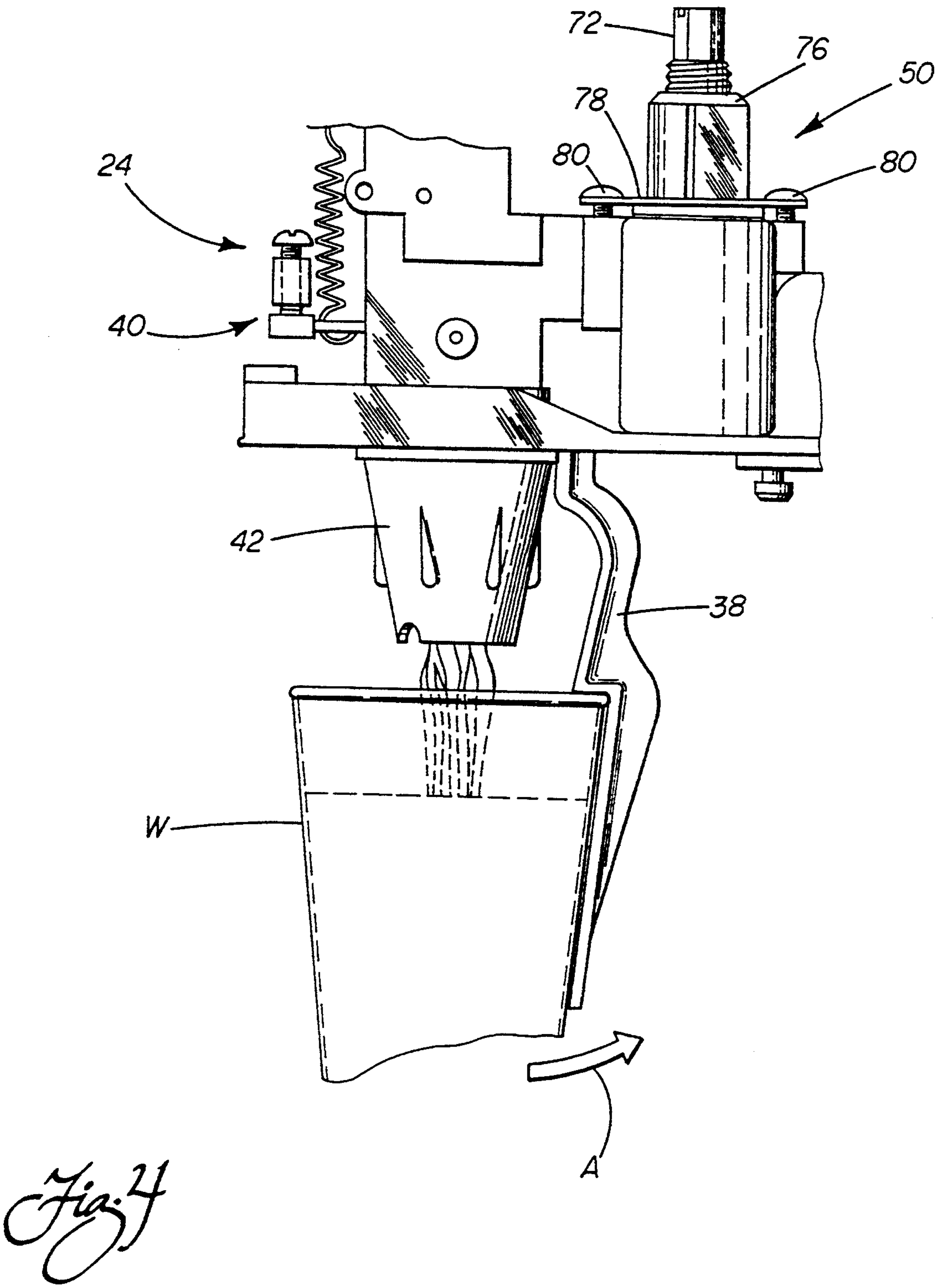
FIG. 4 is a detailed, elevational view of the actuating lever and valves of the drink dispensing apparatus shown in FIG. 1.

A conduit 21, 22 provides gravity flow from the QDC valve 20 to the flow control valve assembly, generally designated in FIGS. 1 and 4 by reference numeral 24. As shown, the conduit 21, 22 includes a T-joint 26. A vent tube 28 is connected to the T-joint and may be utilized in a manner described in greater detail below to release trapped air from the conduit 22. A cap 30 may be positioned on the vent tube 28 once flow is established to prevent dirt and contaminants from entering the conduit system. This cap 30 also prevents the loss or aroma and taste from the drink concentrate to the atmosphere over time.

As also shown in FIG. 1, the apparatus 10 includes a conduit 32 for delivering water to the flow control valve assembly 24 from a source 34 such as a pressurized tap water supply. A pressure regulator 36 provided in the conduit 32 insures that the water from the source 34 is provided at the desired pressure (e.g. 25–30 psi) to insure proper flow.

As best shown in FIG. 4, the flow control valve assembly 24 includes an actuator lever 38 that may be engaged by a cup W and rocked backwards in the direction of action arrow A as shown to commence flow in a manner known in the art. Specifically, the actuator lever 38 opens in tandem a pair of on/off valves, generally designated by reference numeral 40, to initiate the flow of both drink concentrate and water. Specifically, the drink concentrate and water are mixed in the nozzle 42 and the underlying cup W. As indicated above, the flow rate of the water when the valves 40 are opened is determined by the pressure regulator 36. In contrast, the flow rate of the drink concentrate is determined by the novel flow control valve 50 of the present invention.

Figure 3:
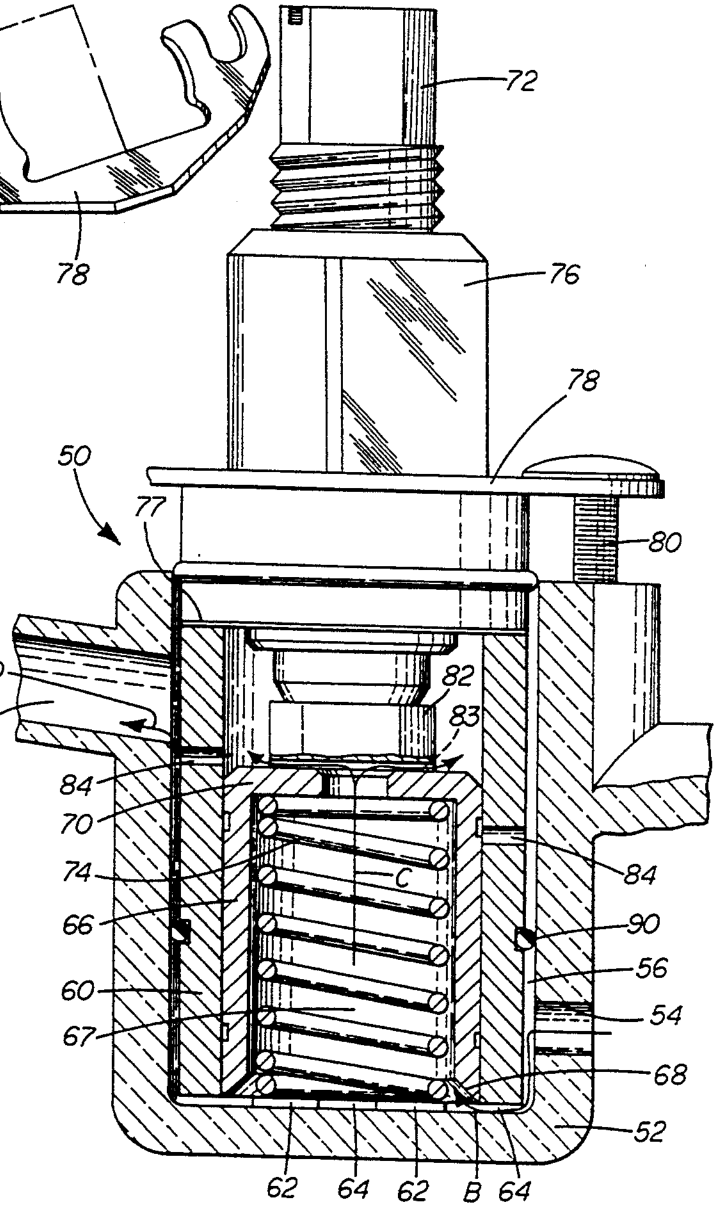

As shown in FIG. 3, the flow control valve 50 includes a housing 52 having a fluid inlet 54, a cavity 56 and a fluid outlet 58. A cylindrical valve body 60 is positioned in the cavity 56 of the housing 52. Specifically, the valve body 60 rests upon a series of spaced ledges 62 at the bottom of the cavity 56. Together, the ledges 62, housing 52 and valve body 60 define a series of radially arrayed channels 64 for the flow of fluid from the inlet 54 (note action arrow B).

A regulating element 66, including a central flow passage 67, is concentrically received within the valve body 60. The regulating element 66 includes a fully opened end 68 and a partially opened end 70 for the passage of fluid (note action arrow C). An adjustment screw 72 cooperates with a coil spring 74 to position the regulating element 66 in the valve 50. Specifically, adjustment screw 72 threadedly engages the block 76 that seats in the housing 52 and closes the top of the cavity 56 and the top of the valve body 60. Specifically a teflon seal 77 insures that drink concentrate does not flow directly over the upper end of the valve body 60 to the fluid outlet 58. A metal clip 78 and pair of mounting screws 80 secure the block 76 in the seated position.

As the screw 72 is turned clockwise, the stop end 82 is extended further, downwardly as shown in FIG. 3, into the flow passage 67. Conversely, as the adjustment screw 72 is turned counterclockwise, the stop end 82 is retracted, further upwardly as shown in FIG. 3 in the flow passage 67. Of course, for any position of the adjustment screw 72, the regulating element 66 is biased against the stop end 82 by means of the coil spring 74.

Figure 2:
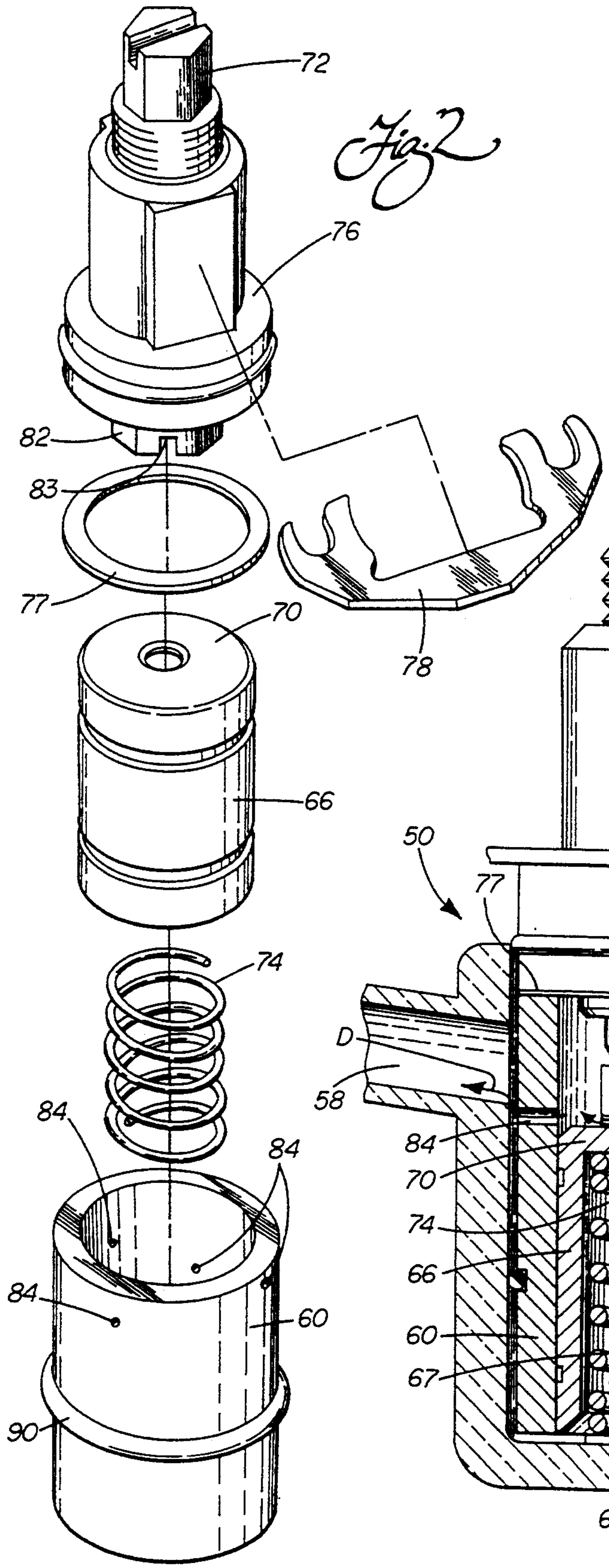
FIG. 2 is an exploded view of the flow control valve of the present invention utilized in the dispensing apparatus shown in FIG. 1 to control the flow of drink concentrate.

It should be appreciated from viewing FIGS. 2 and 3 in combination that, the relative positioning of the regulating element 66 with respect to the valve body 60 controls the flow rate of drink concentrate through the flow control valve 50. More specifically, the valve body 60 includes a series of flow apertures 84. Each flow aperture has a diameter of between 1/20 and 1/40 of an inch and preferably a diameter of approximately 1/25 inch. As shown, the flow apertures 84 are radially arrayed about the circumference of the valve body 60 with at least a 45° arc between each aperture (e.g. 90° arc shown). Additionally, the apertures are spaced along the longitudinal axis of the valve body: that is, each is a differing distance from the upper end or edge of the valve body as shown in FIG. 2.

This radially arrayed and stepped arrangement of the flow apertures 84 operates with the sealing provided by the regulating element 66 to ensure that accurate and precise metering of drink concentrate is provided and bleed-through from one aperture to another is avoided. This is a particularly important aspect of the present invention when the resulting mixed beverage must be to a desired taste and the flow rate of liquid concentrate is so low that even the smallest variation in flow rate could lead to the production of an undesirably weak or strong beverage.

From the above description, it should be appreciated that by adjusting the relative position of the regulating element 66 with respect to the valve body 60, one or more of the flow apertures 84 may be exposed above the regulating element to allow the flow of fluid (note action arrows D) through the valve body 60 to the outlet 58. In contrast, those flow apertures 84 blocked by the regulating element 66 are sealed from communication with the drink concentrate and flow is effectively prevented.

The operation of the fluid dispensing apparatus 10 and more particularly, the flow control valve 50 will now be described in detail.

Initially, a bag-in-box source 16 of drink concentrate is carefully positioned on the shelf 14 in the housing 12. The vent cap 30 is then removed from the vent tube 28 and the bib 18 of the source 16 is positioned over the connector so as to provide fluid communication between the drink concentrate in the interior of the source 16 and the valve 20. A large cup W is then placed under the nozzle 42 and the lever 38 activated to dispense fluid.

When this is done, drink concentrate flows through the conduit 21 to the T-joint 26 and down into the conduit 22. Preferably, the conduit 21 has a cross-sectional area about one half the area of the conduit 22. As a result, drink concentrate tends to flow from the conduit 21 at a rate less than the capacity of the conduit 22. As a result, the concentrate tends to flow down the sidewall of the conduit 22, filling the conduit 22 from the bottom. A space between the drink concentrate and the sidewall allows air to escape from the bottom of the conduit 22 through the T-joint 26 and the vent tube 28.

It is important to be sure that all of the air is released as the rate of flow of the concentrate could otherwise be affected. Specifically, any trapped air could slow or prevent the flow of concentrate through the conduit 22 thereby adversely effecting the delivery rate through the flow control valve 50. Accordingly, a weak and unacceptable beverage mixed at an improper ratio could result.

In the event that the conduit 22 fails to fill completely with liquid concentrate, it may be necessary to utilize a hand pump or bulb (not shown) to clear the trapped air. Specifically, the nozzle end is inserted into the open end of the vent tube 28 and the bulb is squeezed and released. This procedure may be repeated as often as necessary to aggravate the drink concentrate in the conduit 22 so as to release or expel trapped air until the conduit 22 fills with the drink concentrate. The cap 30 is then replaced to seal the vent tube 28 and prevent, not only, dirt from entering the conduit 22 but also the loss of aroma and taste.

Beverage of desired taste may then be dispensed from the apparatus 10. More specifically, a cup W is again placed underneath the nozzle 42. The lever 38 is then engaged by the cup and rocked back in the direction of action arrow A (see FIG. 4) to open the valves 40. When this occurs, water, is dispensed from the source 34 at a rate under control of the pressure regulator 36. Simultaneously, drink concentrate is dispensed from the source 16 through the conduit 22 at a rate set by the flow control valve 50. More specifically, drink concentrate from the conduit 22 flows through the inlet 54. Next the drink concentrate is forced to flow through the channel 64 under the valve body 60 and into the center of the regulating element 66 as shown by action arrow B. Flow in this direction is required by the provision of a seal 90 between the valve body 60 and the inner wall of the housing 52.

The drink concentrate then flows as shown by double action arrow C upwardly through the regulating element 66, through the opening in the end 70 of regulating element 66, then, in turn, through the channel 83 in the stop 82. Next as shown by action arrows D, the drink concentrate flows through the exposed flow apertures 84 in the valve body 60 and then out through the outlet 58 for mixing with water in the nozzle 42 and cup W. Flow through all other flow apertures 84 blocked by the regulating element 66 is prevented.

The mixture ratio of water to drink concentrate, of course, may be adjusted as described above by controlling the flow of drink concentrate through the valve 50 through manipulation of the adjusting screw 72. The coarseness of the thread may be adjusted to meet adjustment sensitivity requirements of any particular application. While effective to provide a water to drink concentrate ratio of 2:1 to 150:1, preferably, the relative flow rate of water to drink concentrate is adjusted to fall between 120:1 to 135:1 and most preferably to approximately 127:1.

In summary, numerous benefits result from employing the concepts of the present invention. A very accurate metering system is provided that allows stronger concentrate to be utilized and precisely metered to produce a beverage of desired strength and taste for consumption. Advantageously, as a higher strength concentrate may be effectively mixed utilizing the present apparatus, a given volume of concentrate from a source may be utilized to produce a greater quantity of beverage before replacement of the source is required.

Accordingly, significant time savings is provided as it is not necessary to complete this task as often. Further, the regulator 66 and valve body 60 are constructed to size specifications that allow their utilization in existing state of the art dispensers. Accordingly, they may be advantageously utilized to convert existing dispensing equipment. This significantly reduces capital costs when changing over to the improved system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A precision flow control valve for accurately metering small amounts of fluid, comprising:

a housing including a cavity, a fluid inlet and a fluid outlet;

a cylindrical valve body received in said cavity and including a stepped arrangement of flow apertures radially arrayed about said valve body, each said flow aperture being circumferentially spaced from an adjacent flow apertures by at least a 45° arc and axially spaced from an adjacent flow aperture so as to be a different distance from an end of said valve body and each flow aperture having a diameter of between 1/20–1/40 of an inch;

a cylindrical regulating element concentrically received in said valve body, said regulating element including first and second open ends so as to form a flow passage;

means for manually adjusting the position of said regulating element relative to said valve body so as to expose one or more of said flow apertures for the passage of fluid, said adjusting means engaging said regulating element at said first end; and means for biasing said regulating element into engagement with said adjusting means, said biasing means engaging said regulating element at said second end.

2. The apparatus set forth in claim 1, wherein said flow apertures have a diameter of substantially 1/25 of an inch.

3. A precision flow control valve for accurately metering small amounts of fluid, comprising:

a housing including a cavity, a fluid inlet and a fluid outlet;

a valve body received in said cavity and including a stepped array of flow apertures, each flow aperture having a diameter of between 1/20–1/40 of an inch and being a different distance from an end of said valve body;

a regulating element received in said valve body and having first and second open ends for the passage of fluid;

means for manually adjusting the position of said regulating element relative to said valve body so as to expose one or more of said flow apertures for the passage of fluid, said adjusting means engaging said regulating element at said first end; and means for biasing said regulating element into engagement with said adjusting means, said biasing means engaging said regulating element of said second end.

4. The apparatus set forth in claim 3, wherein said flow apertures have a diameter of substantially 1/25 of an inch.

* * * * *